United States Patent [19]  
Nakamura et al.

[11] 4,123,976  
[45] Nov. 7, 1978

[54] ATTRACTIVE TYPE ELECTROMAGNET DEVICE FOR MAGNETIC LEVITATION RUNNING VEHICLES

[75] Inventors: Shinji Nakamura, Kawasaki; Kiyoshi Mihirogi, Odawara, both of Japan

[73] Assignee: Japan Air Lines Company, Ltd., Tokyo, Japan

[21] Appl. No.: 791,218

[22] Filed: Apr. 27, 1977

[30] Foreign Application Priority Data

Feb. 21, 1977 [JP] Japan ................................. 52/17220

[51] Int. Cl.$^2$ ............................................. B16B 13/08
[52] U.S. Cl. ....................... 104/148 MS; 104/148 LM; 310/12
[58] Field of Search .... 104/148 MS, 148 R, 148 LM, 104/148 SS, 134; 310/12, 13; 188/43

[56] References Cited

U.S. PATENT DOCUMENTS 3,741,613 6/1973 Pfaler ............................. 104/148 MS
3,837,287 9/1974 Lichtenberg ................. 104/148 MS

FOREIGN PATENT DOCUMENTS 2,150,244 4/1973 Fed. Rep. of Germany ... 104/148 MS
2,203,189 8/1973 Fed. Rep. of Germany ... 104/148 MS
2,420,245 10/1975 Fed. Rep. of Germany ... 104/148 MS
1,479,123 3/1967 France ............................... 188/43

Primary Examiner—Albert J. Makay
Assistant Examiner—Carl Rowold
Attorney, Agent, or Firm—Armstrong, Nikaido, Marmelstein & Kubovcik

[57] ABSTRACT

An improvement of the attractive type electromagnet device for the magnetic levitation running vehicles. Each of the electromagnets arranged in two longitudinal rows has a U-shape-cross-section core of which opposite ends are each slanted to face downwards and a coil so wound around each leg portion of the core that the bent portions of the coil bundle are each downwardly dropped. Thus every adjacent two electromagnets can be longitudinally closely arranged at the upper sharpened edges of said slanted core ends and at the upper outer edges of said coil bundle downwardly drooped bent portions. Thus it is possible to overcome defaults of the prior arts, namely magnetic flux interruptions and so on.

3 Claims, 14 Drawing Figures

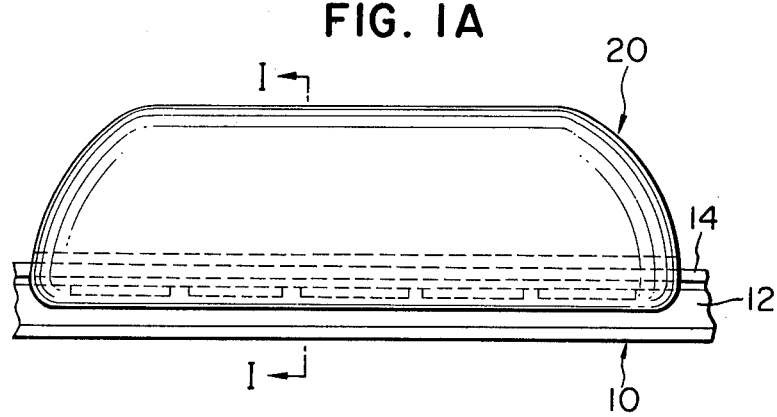
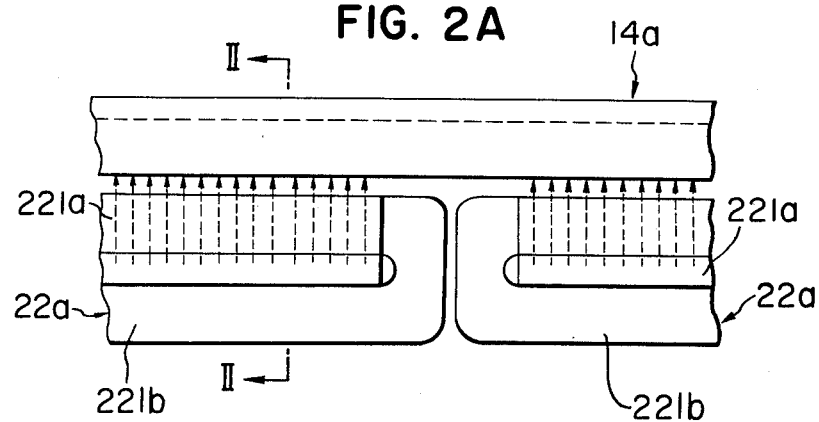
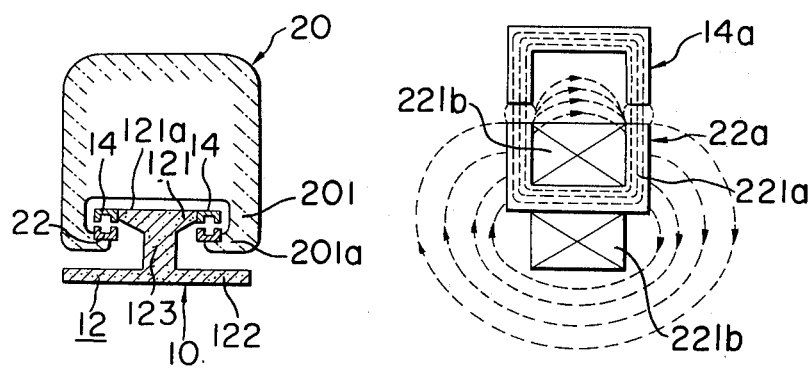

ATTRACTIVE TYPE ELECTROMAGNET DEVICE FOR MAGNETIC LEVITATION RUNNING VEHICLES

The present invention relates to an attractive type electromagnet device for magnetic levitation running vehicles, and more particularly to an improvement in such device of the electromagnet of the type having a coil wound not around the root portion but around each of the leg portions of a core U-shaped in the cross section.

The "magnetic levitation running vehicle" referred to herein represents such a cargo or passenger transporting vehicle as having a plurality of electromagnets adapted to be electrically energized so as to generate magnetic force in relation to armature rails extendedly laid on the ground for levitating the vehicle with suspension gap therebetween to be driven by a linear induction motor or any other prime mover for running at a high speed.

The attractive type electromagnetic device for said magnetic levitation running vehicle, generally, comprises two longitudinal rows of electromagnets disposed beneath the vehicle symmetrically to one another with respect to a vertical median plane passing through the vehicle in the direction of travel thereof, each row consisting of a number of electromagnets arranged one behind another and each electromagnet having a coil wound around an elongated core U-shaped in the cross section which is so arranged as to direct the free ends of the legs of said "U" upwards, while each of said armature rails also is of U-shape in the cross section and so arranged that the free ends of the legs of "U" are directed downwards and substantially faced to the concerned free ends of the legs of the electromagnet core of the vehicle. The suspension gaps between the armature rail and each of the electromagnets in the longitudinal row may be kept substantially constant by controlling electric current to be supplied thereto according to any suitable technique known per se.

There are naturally two ways for winding a coil around the U-cross-section core of the electromagnet, one of which is the wind the coil around the root portion of "U" while the other is to wind coils respectively around the two legs of "U". As to the electromagnets of the former winding, there is considerable amount of leakage flux to be present due to the construction itself so that it becomes necessary to employ relatively large cross-sectional area of said root portion of the core in order to obtain the desired attractive suspension force which in turn causes the increased weight of the vehicle which is to be provided with many electromagnets. The electromagnetic device according to said latter winding is more preferable in respect of the matter referred to above but still disadvantageous in that there are naturally provided bent portions of the coil bundle at the both ends of the elongated magnet core so that the adjacent two electromagnet cores can not be arranged so close to each other, which results in some interruption of magnetic fluxes bridging the air gap between the lower surface of the armature rail and the upper surface of the electromagnetics in the longitudinal direction, although this may be applied as well to those of said former winding method. Due to such interruptions of magnetic fluxes, there is caused eddy current in the armature rail when the vehicle is in motion relative to the rail so that the magnetic drag is increasingly generated to adversely affect on the running speed of the vehicle or the force for driving the vehicle.

An object of the invention is, thus, to avoid and overcome such defaults of the prior arts and provide an improved electromagnet device for the magnetically levitated vehicles.

Said and other objects as well as various advantages to be appreciated are attained according to the invention by arranging a plurality of electromagnets, each of said electromagnets having an elongated core U-shaped in the cross section of which both ends are each slanted to face obliquely downwards and a coil wound around each of two legs of the core so that the bent portions of the coil bundle are each downwardly drooped at the slanted ends of the elongated core leaving a bare area not covered with the coil bundle at an upper portion of each of said slanted ends. In this manner, every adjacent two electromagnets are closely positioned with each other at the upper sharpened edges of said slanted ends of the cores and at the upper outer edges of said downwardly drooped bent portions of the coil bundles.

As a result of the construction of each electromagnet and the arrangement of such electromagnets as referred to above, there is produced a transversely extended space gap defined by the obliquely downwardly faced bare surfaces of the slanted ends of the cores and the obliquely upwardly faced surface of the downwardly drooped bent portions of the coil bundles, between every two adjacent electromagnets. These space gaps formed along the length of the vehicle body at the both sides thereof and just below the extended armature rails are very advantageous for providing mechanical brakes. In the electromagnetic suspension vehicle systems, it is necessary to mount the electromagnets longitudinally along the length of the vehicle with little space gap in order to produce the effective magnetic flux between such longitudinal row of electromagnets and the armature rail without substantial interruption as referred to above. This necessity results in the fact that there can be provided no space for the installation of mechanical brakes which are necessary for such vehicles running at a high speed, although any electromagnetic brake can be provided, as an additional or auxiliary braking means.

This it is an additional object of the invention to provide the electromagnet device capable of providing mechanical braking means cooperative with the armature rail.

The above and other objects of the invention as well as advantages to be attained thereby will more readily be appreciated from following description on some prior arts and embodiments of the invention, references being made to the accompanying drawings in which;

FIG. 1A is a schematic vertical side view showing an electromagnetically levitated running vehicle having a plurality of conventional electromagnets mounted beneath the body thereof and a support track provided with a pair of armature rails, on which said vehicle floatingly straddle when running;

FIG. 1B is a section taken along line I — I of FIG. 1A to show the relation between the armature rails secured to the track along its both sides longitudinally and the electromagnets of the running vehicle so arranged as to oppose to the armature rails;

FIG. 2A is an enlarged partial side view showing the relation of one of the armature rails and two conventional electromagnets of the running vehicle arranged as shown in FIGS. 1A and 1B and each having a coil wound according to the known first method;

FIG. 2B is a section taken along line II—II of FIG. 2A;

Figure 3A:
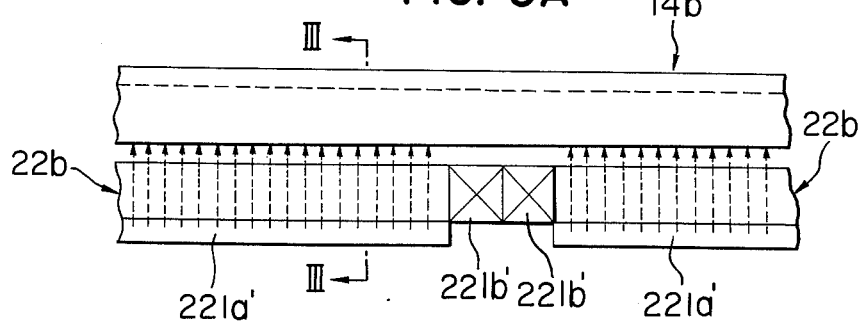
FIG. 3A is a view similar to FIG. 2A, excepting that each electromagnet has a coil wound according to the known second method.

Referring now to FIGS. 1A and 1B, there are schematically shown a track 10 and an electromagnetically levitated running vehicle 20 to straddle the track 10. The track 10 comprises a body or support 12 which may be of a reinforced concrete structure having upper flange portions 121, 121 with a flat top surface 121a, a base portion 122 and a leg portion 123 which connects the flange portions 121, 121 to the base portion 122, and a pair of armature rails 14, 14, each of which has an inverted U-shape in the cross section is composed of a ferromagnetic material, e.g. iron and securely mounted to each side edge of the flange portions 121, 121. The running vehicle 20 has a skirt portion 201 at each longitudinal side of the vehicle 20, each skirt portion 201 having a flange 201a which extends inwardly toward the leg portion 123 of the track 10 so as to surround the flange or head portion 121 of the track 10 and being provided with a row of a number of electromagnets 22 arranged one behind another and securedly mounted on inner or upper surface of the flange 201a so as to oppose to the armature rail 14 of the track 10. Each of the electromagnets 22 comprises, an elongated iron core of U-shape in the cross section and a bundle of wound coil for generating a magnetic flux. The coil bundles on electromagnets, however, are not shown in FIG. 1B for the simplification purpose.

The vehicle 20 will be levitated on the track 10 with a constant gap therebetween as shown in FIG. 1B by applying a controlled exciting current to the coil of each electromagnetic 22 and may be driven by a linear induction motor or any other prime mover for the vehicle to run at a high speed along the track 10.

Some electromagnet devices of the prior art shall be explained hereinafter with reference to FIGS. 2A to 4B.

FIGS. 2A and 2B show the first conventional electromagnet 22a arranged opposite to an armature rail 14a. According to this type electromagnet 22a, a coil is wound around a root or base portion of an elongated core 221a having the U-shaped cross section to form a winding bundle 221b. With this type of electromagnet, much amount of magnetic flux leakage as shown in FIG. 2B will be produced. In order to increase effective magnetic flux contributing to magnetic levitation of the vehicle with this electromagnet, the cross sectional area of the root portion of the core 221a has to be made larger. This would inevitably cause serious disadvantage of weight increase at each electromagnet 22a and consequently of the vehicle 20.

The first conventional electromagnet device has another disadvantage in that, as seen from FIG. 2A, each of the winding bundles 221b has bent portions turning free ends of the root portion of the core 221a so that longitudinally adjacent electromagnets 22a can not be arranged so close with each other which results in an interruption of magnetic flux bridging the air gap between the free ends of the legs of the armature rail 14a and of the core 221a of the electromagnet 22a, as shown with magnetic force lines in FIG. 2A. Such interruption of magnetic flux generates eddy current in the armature rail 14a when the vehicle is in motion relative to the armature rail to cause undesired magnetic drag of the running vehicle.

Figure 3B:
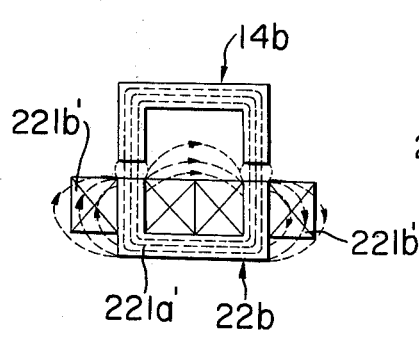
FIG. 3B is a section taken along line III—III of FIG. 3A.

FIGS. 3A and 3B show the second conventional electromagnet 22b arranged opposite to an armature rail 14b similar to the armature rail 14a of FIGS. 2A and 2B. This type electromagnet 22b comprises an elongated core 221a' having the U-shaped cross section and two winding bundles 221b', each of said winding bundles 221b' being formed by winding a coil on each leg portion of the core 221a'. This electromagnet device has an advantage in that, as shown in magnetic flux lines in FIG. 3B, the amount of magnetic flux leakage is less than that in the first type device as shown in FIGS. 2A and 2B. However, the second type electromagnet device can also not overcome the disadvantage of magnetic flux interruptions between the longitudinally adjacent electromagnets 22b, 22b due to the presence of bent portions of the winding bundle 221b', as referred to in connection with the first type device.

Figure 4A:
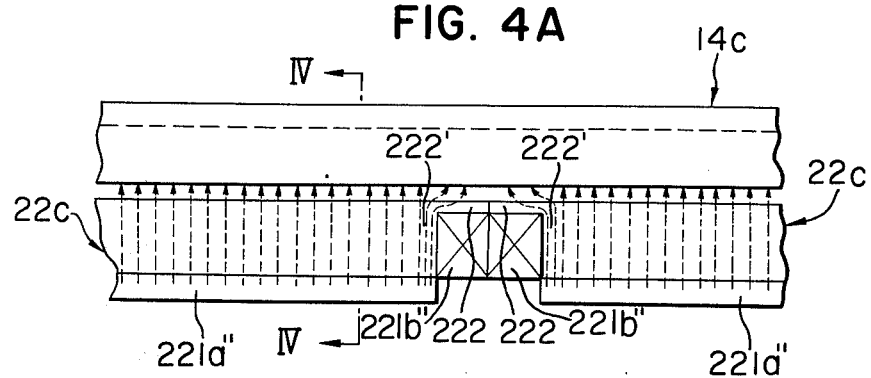
FIG. 4A is a view similar to FIG. 2A, excepting that each electromagnet has a coil wound according to the known third method.
Figure 4B:
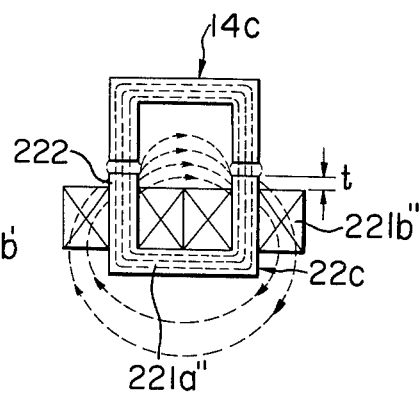

FIGS. 4A and 4B show the third conventional electromagnet 22c arranged opposite to an armature rail 14c. This type electromagnet device has been proposed to overcome the disadvantage of magnetic flux interruption encountered in the first and second type devices. This third type electromagnet device is similar to the second type device as shown in FIGS. 3A and 3B but different therefrom in that two winding bundles 221b" of each electromagnet 22c are so arranged on each leg portion of an elongated core 221a" having the substantially U-shaped cross section that the upper surface of each winding bundle 221b" is made lower than the free end surface of each leg portion of the core 221a" to expose some upper area of the core leg portions by a distance of "t" as best shown in FIG. 4B. The elongated core 221a" has longitudinal extensions 222 each of the thickness of said dimension "t" so as to extend over each bent portion of the winding bundle 221b" and so as to abut on the free end of the opposite extension 222 of the adjacent electromagnet, whereby the electromagnets can be arranged in a longitudinal row with little interruption. This third type device, however, shows disadvantages in that a relatively large amount of magnetic flux leaks from the bare portion of the leg portions of the core 221a" where the coil is not wound as shown in FIG. 4B and that, since all magnetic fluxes bridging the air gap between the upper surface of each extension 222 and the free ends of each legs of the armature rail 14c pass through each root portion 222' of the extension 222, an undesired magnetic saturation is apt to be caused in each of said root portion 222'.

Figure 5:
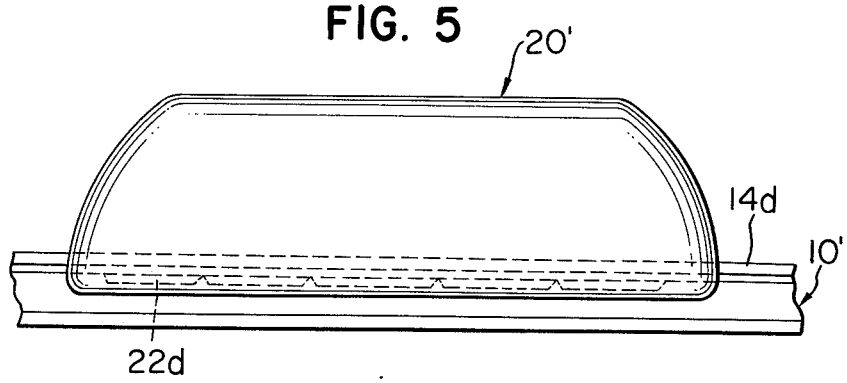
FIG. 5 is a view similar to FIG. 1A to show an electromagnetically levitated running vehicle provided with the electromagents according to the present invention.

A preferred embodiment of the invention shall now be explained with reference to FIGS. 5, 6A, 6B and 7 of the drawings. FIG. 5 is a schematic vertical side view of a running vehicle 20' provided with a plurality of electromagnets according to the present invention and electromagnetically levitated by said electromagnets with an aid of a pair of stationary armature rails 14d securedly mounted on a support track 10'. According to the invention, as seen from FIGS. 6A and 6B and more particularly from FIG. 7, each electromagnet 22d is formed by winding a coil to each leg portion of an elongated core 221a''' having substantially U-shaped cross section and cut obliquely at the both ends 222a to each face obliquely downwards. Each winding bundle 221b''' on such core 221a''' has bent portions correspondingly dropped downwards so that some upper area 222a of said slanted ends of the core 221a''' is exposed and not covered with each winding bundle 221b'''. A plurality of electromagnets each having such structure according to the invention can be arranged longitudinally one behind another to form a longitudinal row of electromagnets with little interruption so that the upper sharpened edges 222a of the slantedly cut ends of each core 221a''' and the outermost edges of the drooped bent portions of each winding bundle 221b''' positioned closely with those of the adjacent electromagnet, as best shown in FIG. 6A.

In spite of that the electromagnet device according to the invention has bare leg portions of the core 221a''' where the coil is not wound, it is found that the density of magnetic fluxes bridging the air gap between the upper surfaces of such bare leg portions of the core 221a''' and the free end surfaces of each armature rail 14d is not so increased as compared with the magnetic flux density in any other portion of the core 221a''', whereby there is no possibility of causing magnetic saturation in such portions, even if the cross sectional area of the core is not enlarged to avoid weight increase of the electromagnet. Furthermore, with the electromagnet device of the invention, the amount of magnetic flux leakage can remarkably be reduced as shown with magnetic flux lines in FIG. 6B so that almost all magnetic fluxes generated by this electromagnet can be effectively used for levitating the running vehicle 20'.

It is inevitably necessary rather than preferable for the electromagnetically levitated running vehicles to provide a mechanical braking device. Hitherto it has been difficult to provide a number of braking devices for the vehicle without causing any adverse influence on effective magnetic fluxes to be generated by a number of electromagnets arranged on the vehicle. The electromagnet device arrangement according to the present invention dissolves this problem, as described hereinafter.

Figure 6A:
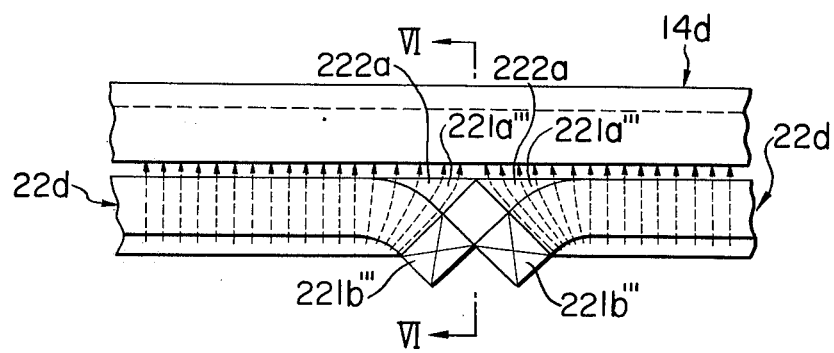
FIG. 6A is a view similar to FIG. 2A, excepting that each electromagnet has a core of the slanted ends and a coil wound according to the present invention and is mounted on the running vehicle as shown in FIG. 5.
Figure 6B:
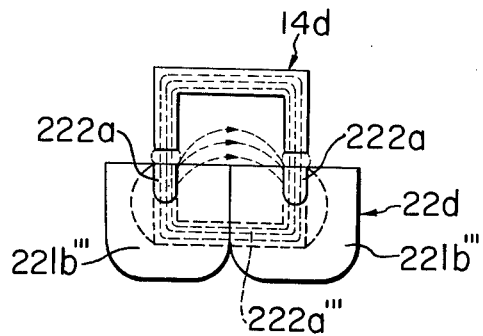
FIG. 6B is a section taken along line VI—VI of FIG. 6A.
Figure 7:
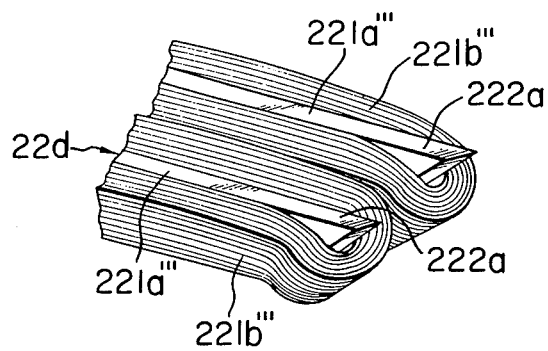
FIG. 7 is a perspective partial view of the electromagnet as shown in FIGS. 5, 6A and 6B.
Figure 8A:
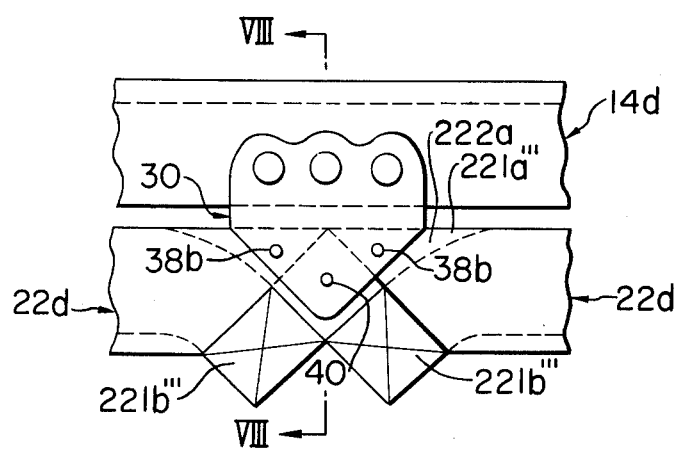
FIG. 8A is a further enlarged vertical side view of the electromagnet according to the present invention, in which a brake device is incorporated.
Figure 8B:
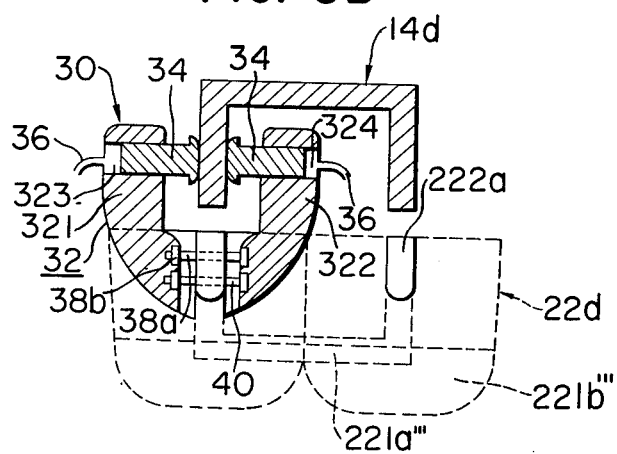
FIG. 8B is a section taken along line VIII—VIII of FIG. 8A.

As seen from FIGS. 6A and 7, the obliquely cut end surfaces of the core 221a''' and the slanted upper surfaces of the drooped bent portions of the winding bundles 221b''' of each electromagnet 22d define a transversely extended space having a substantially square cross section between two adjacent electromagnets. Therefore, the space may be used for providing a mechanical brake device 30 as shown in FIGS. 8A and 8B. The brake device 30 as illustrated comprises a body 32 divided into two blocks 321, 322 respectively upstanding from the space to face at the upper portion thereof to the surface of one of the suspended legs of the armature rail 14d having U-shaped cross section, sliders or braking shoes 34 fittingly inserted in bores 323, 324 formed in the upper portions of the blocks 321, 322 and pipings 36, 36 communicating the bores 323, 324 to the source of fluid under pressure not shown, to operate the sliders 34, so that the sliders can move from its nonbraking position to its braking position as shown in FIG. 8B or vice versa. The blocks 321, 322 can be assembled together by, for instance, inserting bolts 38a, each of which passes through an opening formed in one of the blocks, an opening formed in the edge-like end 222a of an adjacent core 221a''' and an opening formed in the other block and attaching nuts 38b to the bolts 38a. The blocks 321, 322 may further by connected with each other with use of another bolt-nut means 40, the bolt of which passes through an opening formed in one of the blocks, an opening formed in another block not shown, inserted in a space defined by the adjacent cores 221a''', adjacent winding bundles 221b''' and the blocks 321, 322 and an opening formed in the other block.

As seen from FIGS. 8A and 8B, the brake device 30 may be arranged in every space defined by two adjacent electromagnets 22d, 22d and thus a sufficient number of brake devices may be provided for the vehicle.

What is claimed is:

1. In an attractive type electromagnet device for a magnetic levitation running vehicle including two longitudinal rows of electromagnets disposed beneath the vehicle, the rows being symmetrical to one another with respect to a vertical median plane passing through the vehicle in the direction of travel thereof, each row having a number of adjacent electromagnets, each electromagnet having an elongated core U-shaped in cross section and a coil wound around each of the legs of said U-shaped core, the improvement wherein both ends of said elongated core are slanted obliquely downwards for the entire length of the ends and the coil includes a straight portion aligned with the top of the core and bent portions downwardly directed at the slanted ends of the core wherein a gap not covered with the coil is formed adjacent to the upper portion of each of said slanted ends and adjacent electromagnets are closely positioned with each other at the upper pointed edges of said slanted ends of the cores and at the upper outer edges of downwardly directed bent portions of the coil.

2. The electromagnet device as claimed in claim 1, wherein said gap is defined by the obliquely downwardly directed surfaces of the slanted ends of the cores and the obliquely upwardly directed surfaces of the downwardly directed bent portions of the coil.

3. The electromagnet device as claimed in claim 2, wherein a mechanical braking means is mounted on the vehicle body in said gap.

* * * * *